US005215230A

United States Patent [19]

[11] Patent Number: 5,215,230

[45] Date of Patent: Jun. 1, 1993

Lee

[54] TRIGGER MECHANISM FOR GLUE GUN

[75] Inventor: Grace Lee, Chia Yi Hsien, Taiwan

[73] Assignee: Homeease Industrial Co., Ltd., Taiwan, Taiwan

[21] Appl. No.: 733,630

[22] Filed: Jul. 22, 1991

[51] Int. Cl.[5] .............................................. G01F 11/06

[52] U.S. Cl. ................................ 222/336; 222/146.2; 222/146.5; 222/391

[58] Field of Search .................. 222/146.2, 146.5, 323, 222/336, 391; 219/230

[56] References Cited

U.S. PATENT DOCUMENTS 4,009,804 3/1977 Costa et al. ........................ 222/391
4,378,076 3/1983 Stirnweiss ........................ 222/146.5
4,523,705 6/1985 Belanger et al. ............ 222/146.5 X
4,781,482 11/1988 Ursprung ........................ 222/391 X
4,949,881 8/1990 Wantanabe et al. ......... 222/146.2 X
5,026,188 6/1991 Capodieci .................... 222/146.5 X

FOREIGN PATENT DOCUMENTS 2033018 5/1980 United Kingdom ................ 219/230
8910324 11/1989 World Int. Prop. O. .......... 219/230

*Primary Examiner*—Andres Kashnikow
*Assistant Examiner*—Joseph A. Kaufman
*Attorney, Agent, or Firm*—Jacobson, Price, Holman & Stern

[57] ABSTRACT

A glue gun having a structure for pushing a glue stick inserted in a hollow passage in a pushing base, provided with a pushing block to be moved by movement of a trigger, an arm and a connecting plate to push forward the glue stick together with the pushing base.

3 Claims, 3 Drawing Sheets

TRIGGER MECHANISM FOR GLUE GUN

BACKGROUND OF THE INVENTION

A conventional glue gun shown in FIGS. 1, 2, comprises a trigger 1 to be repeatedly pressed to cause the top of a pusher 2 to push continuously forward the bottom side of a glue stick 3, which is then moved forward gradually. But the chances are that the pusher 2 may slip on the glue stick and not effectively push forward the glue stick as expected.

SUMMARY OF THE INVENTION

The object of this invention is to provide a glue gun wherein the pusher may not slip in pushing forward the glue stick in using a glue gun.

The glue gun in accordance with the present invention comprises a trigger to be pressed to move backward to a first retreated position, and then to a second position, an arm to be rotated clockwise to two different angles by the trigger when pressed to said two different positions, a connecting plate to be moved forward by the arm when rotated to said two different angles, a pushing block to be rotated by the connecting plate to extend in a hollow passage in a pushing base to push upward firmly against a glue stick inserted in the hollow passage, and a pushing base having a horizontal hollow passage for a glue stick inserted therein, an opening in the hollow passage for the pushing block to extend in to push upward the glue stick and a projecting-forward foot fitted around by a coiled spring to resist forward movement of the pushing base.

When the trigger is pressed to move to the first retreated position, the pushing block can rotate with a pin as a center to push upward firmly against the glue stick so that the glue stick is kept immovable in the pushing base, and then when the trigger is further pressed to move to the second retreated position, the pushing block can no longer move but the pushing base together with the glue stick can be moved forward against the force of the coiled spring fitted around the foot.

If the trigger is released after having been pressed, a recovery spring can pull back the arm and then the trigger to its normal position.

BRIEF DESCRIPTION OF THE DRAWINGS

This invention will now be described in detail with reference to accompanying drawings wherein.

DETAILED DESCRIPTION OF THE INVENTION

Figure 6:
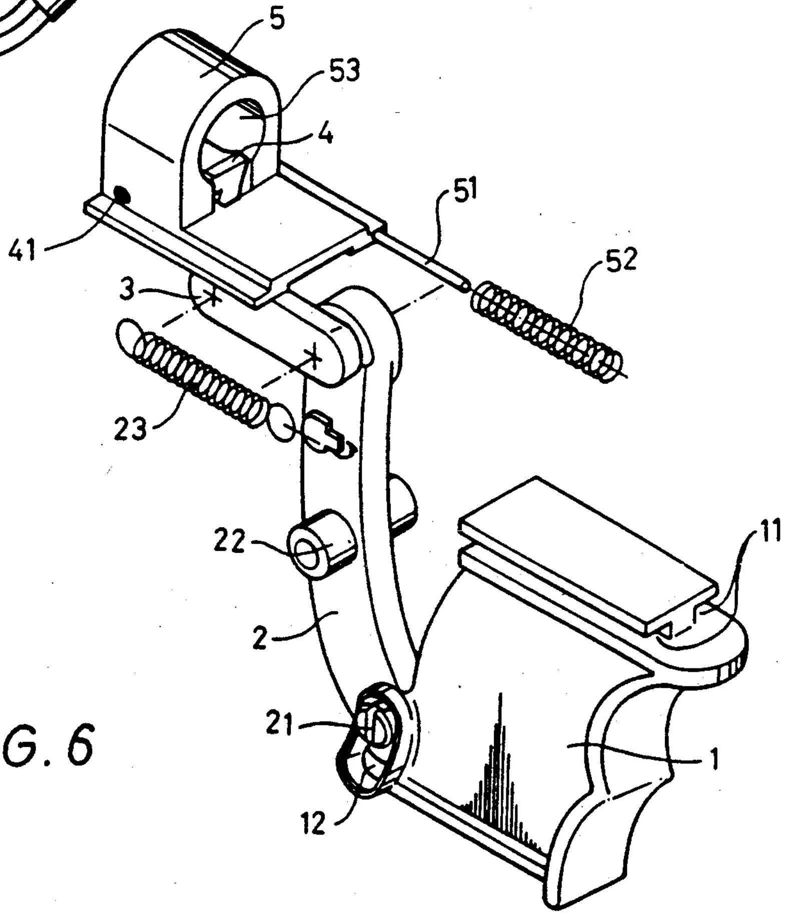
FIG. 6 is a perspective view of the main related components in a glue gun in the present invention.

A glue gun in the present invention, as shown in FIG. 6, comprises a trigger 1 provided with two straight horizontal opposite grooves 11 at the top to be fitted in by a rail at the lower section of a housing so that the trigger 1 can move back and forth straightly guided by the grooves 11 moving along the rail. The trigger 1 also has a hole 12 at the lower front section for a position pin 21 of an arm 2 to fit therein. The arm 2 has a fulcrum 22 at the middle positioned by the housing so that the arm 2 can rotate with the fulcrum 22 as a center when the trigger is pressed, pulling forward a connecting plate 3, which has its rear end connected with the upper end of the arm 2 and the front end connected with the lower part of a pushing block 4. The pushing block 4 is connected with a pushing base 5 by means of a pin 41. The pushing base 5 is provided with a projecting-forward foot or pin 51 fitted with a coiled spring 52 having one end resting on a wall of the housing and the other end resting on the front edge of the pushing base 5 so that the forward movement of the pushing base 5 can be hampered by the coiled spring 52. Therefore, when the connecting plate 3 pulls the pushing block 4, the pushing block 4 can be forced to rotate with the pin 41 as a center, having the top to extend in a hollow passage 53 in a pushing base 5 wherein a glue stick 6 fits in horizontally. And the glue stick 6 is pressed against the wall of the hollow passage 53 and moved forward together with the pushing base 5 by the pushing block 4.

Figure 1:
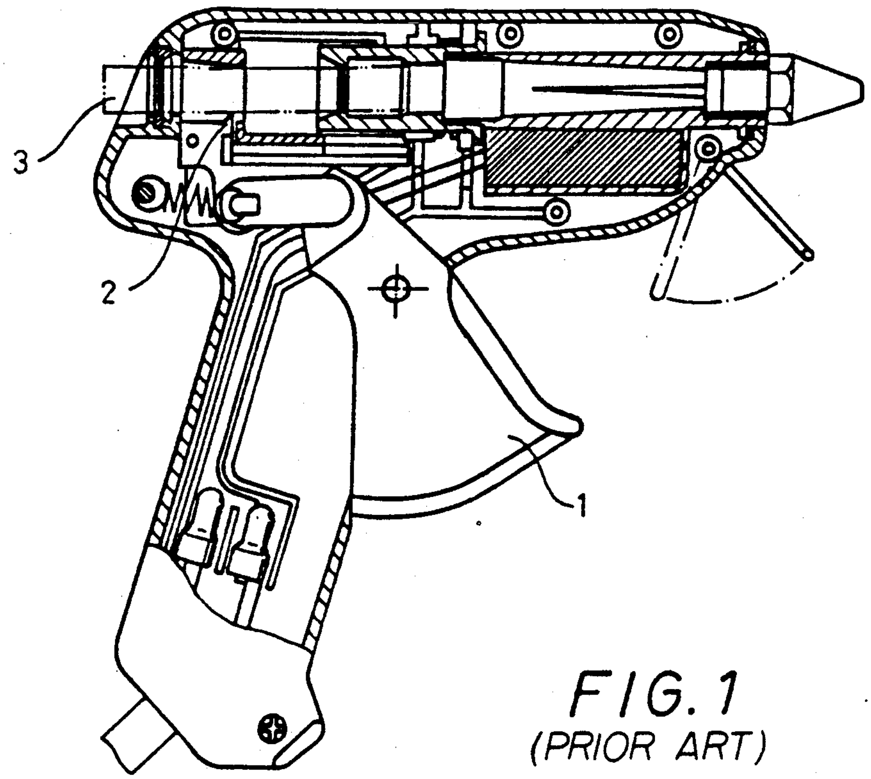
FIG. 1 (PRIOR ART)
FIG. 1 is a structural view of a conventional glue gun.
Figure 2:
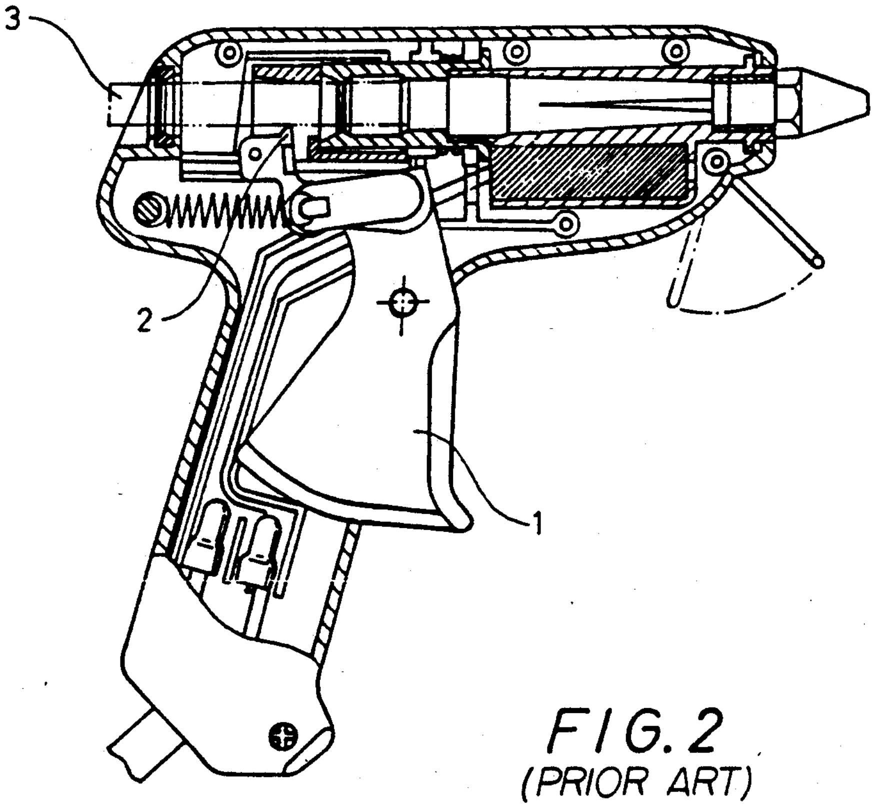
FIG. 2 (PRIOR ART)
FIG. 2 is an operational view of the conventional glue gun.
Figure 3:
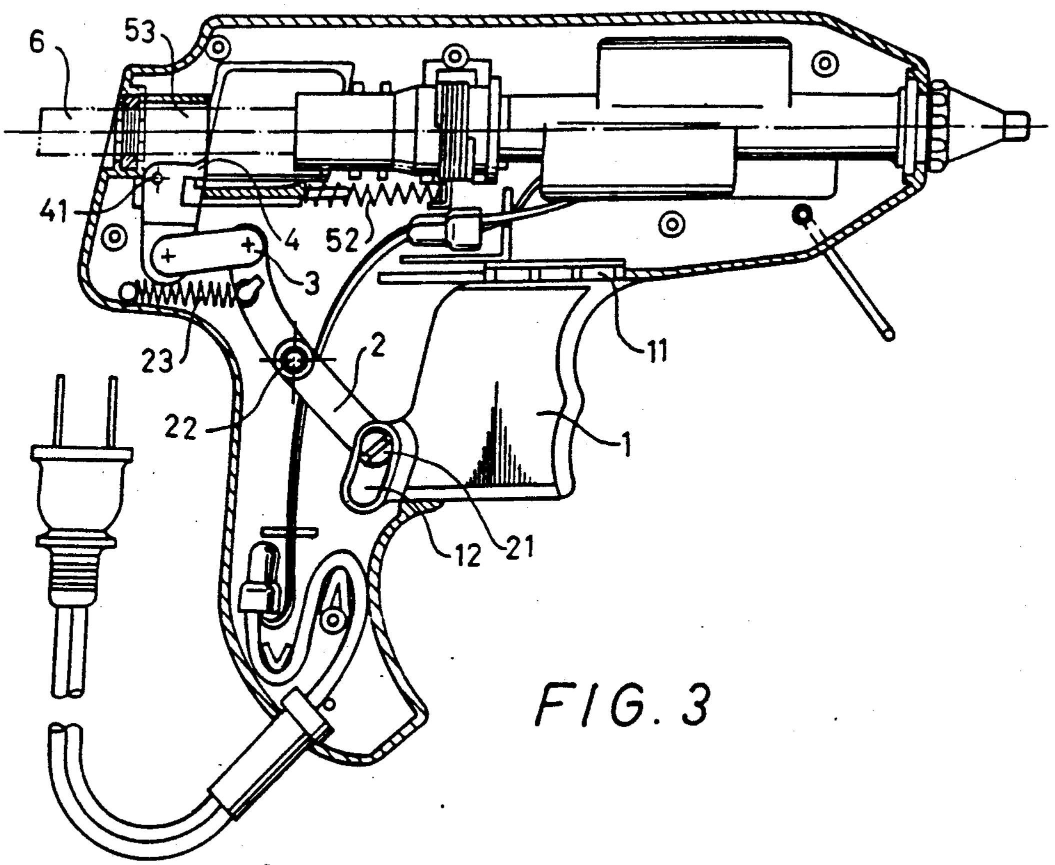
FIG. 3 is a cross-sectional view of a glue gun in accordance with the present invention.
Figure 4:
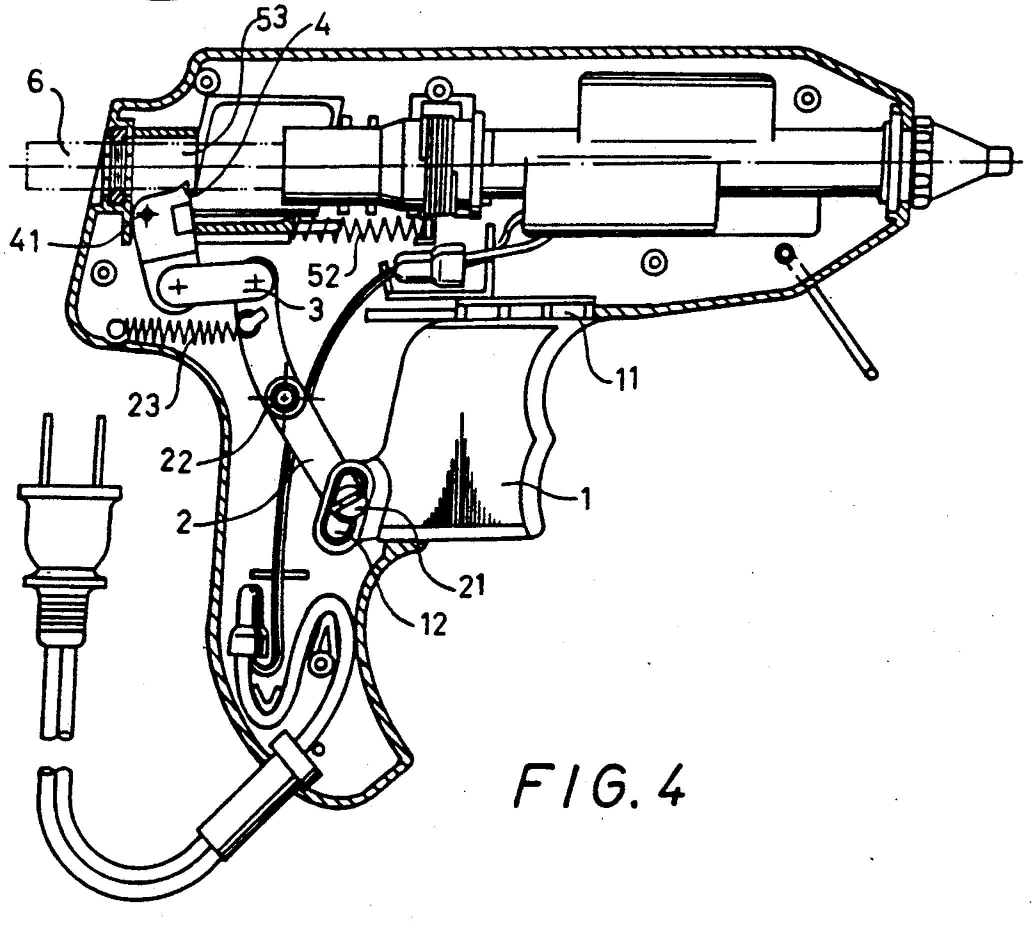
FIG. 4 is an operational view of a glue gun in accordance with the present invention.

Next, FIG. 3 shows that the pushing base 5 is normally forced to retreat to the normal position by elasticity of the coiled spring 52 when this gun is not being used. The arm 2 is always under pulling force of a coiled spring 23, so as to push the trigger 1 forward and 23 to separate the top of the pushing block 4 from the glue stick 6 if the trigger is released after having been pressed back so that the trigger 1 and the arm 2 recover its normal position. As FIG. 4 shows, when the trigger 1 is pressed backward to a first retreated position, the arm is rotated a little clockwise, forcing the pushing block 4 to turn to push upward firmly the glue stick 6. But the pushing base 5 is stopped by the coiled spring 52, unable to move forward.

Figure 5:
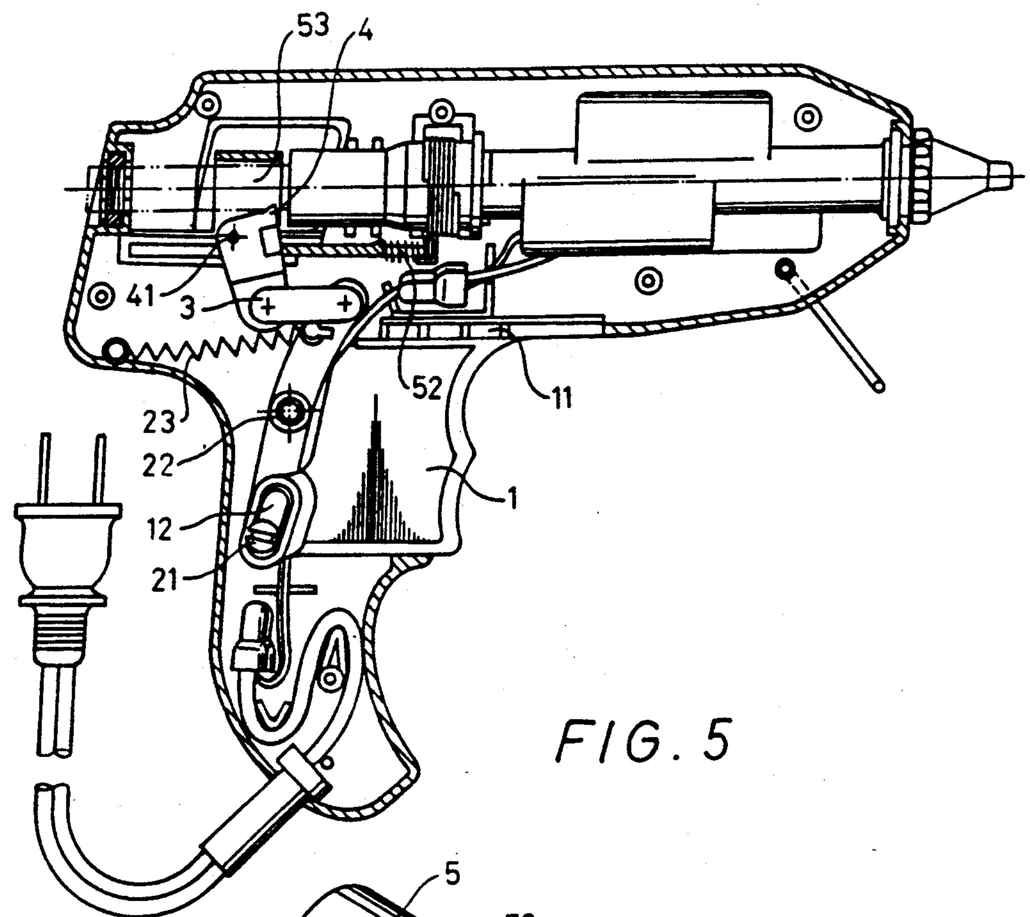
FIG. 5 is another operational view of a glue gun in accordance with the present invention.

Now, FIG. 5 shows that the trigger 1 is further pressed from the first retreated position to a second retreated position, forcing the arm 2 to continue to rotate further clockwise. Meanwhile, the pushing block 4 can no longer turn stopped by the glue stick 6, firmly pushing up the glue stick 6 in the hollow passage 12 and the pushing base 5 which is then to be moved forward against the elastic force of the coiled spring 52, which is then compressed so that the glue stick 6 can be moved forward together with the pushing base 5.

The structure of the glue gun in the present invention allows the glue stick 6 to be first pushed by the pushing block 4 upward firmly to press against the wall of the hollow passage 12 in the pushing base 5, and then force the pushing base 5 together with the glue stick 6 to move forward. Therefore, slipping of the pushing block 4 off the glue stick 6 can never occur, and the glue stick 6 can be moved forward accurately without fail.

What is claimed is:

1. A glue gun comprising a housing having a handle portion and a glue-dispensing portion above the handle, the glue-dispensing portion including a passageway for a glue stick and a pushing base for pushing the glue stick along the passageway, the handle portion including a trigger for operating the pushing base and linkage means connected between the trigger and the pushing base for converting rearward pulling movement of the trigger into forward movement of the pushing base, wherein the pushing base includes a hollow passage to receive the glue stick, a forwardly projecting pin, and a coil spring on said pin engaging a wall of said housing for resisting forward movement of the pushing base and urging the pushing base rearwardly, wherein the linkage means includes a pushing block pivotally connected to the pushing base with a portion of said pushing block extending within said hollow passage, wherein the trigger has an extended position, a first retracted position and a second retracted position and wherein the linkage means further includes link means connected between the trigger and the pushing block for converting pulling movement of the trigger from the extended position to the first retracted position into pivoting movement of the pushing block relative to the pushing base effective to cause said portion of the pushing block to grip the glue stick and for converting further pulling movement of the trigger from the first retracted position to the second retracted position into forward movement of the pushing base and pushing block in unison against the force of the said spring to advance the glue stick along said passageway.

2. A glue gun according to claim 1 wherein the trigger is mounted for sliding movement in said casing between the respective positions and wherein the link means includes a pivot arm and a connecting plate, the pivot arm comprising a centrally located fulcrum, one end having a pin and slot connection with the trigger and an opposite end pivotally connected to one end of the connecting plate and wherein the connecting plate has an opposite end pivotally connected to the pushing block.

3. A glue gun according to claim 2, wherein the housing includes a tension spring connected to said pivot arm for urging the trigger toward said extended position.

* * * * *